United States Patent
Tabor et al.

(10) Patent No.: US 6,955,325 B1
(45) Date of Patent: Oct. 18, 2005

(54) DELTA KITE WITH FLIGHT STABILIZING, AIR-PASSING RING STRUCTURE

(76) Inventors: Don Tabor, 30765 Pacific Coast Hwy., Malibu, CA (US) 90265; Francis Alonso, 30765 Pacific Coast Hwy., Malibu, CA (US) 90265

( * ) Notice: Subject to any disclaimer, the term of this patent is extended or adjusted under 35 U.S.C. 154(b) by 0 days.

(21) Appl. No.: 10/878,134

(22) Filed: Jun. 25, 2004

Related U.S. Application Data

(63) Continuation-in-part of application No. 29/202,442, filed on Mar. 31, 2004.

(60) Provisional application No. 60/561,703, filed on Apr. 13, 2004.

(51) Int. Cl.[7] ............................................. B64C 31/06
(52) U.S. Cl. ................................................. 244/153 R
(58) Field of Search .... 244/153 R–155 A; D21/88–89

(56) References Cited

U.S. PATENT DOCUMENTS

| | | | |
|---|---|---|---|
| 1,849,133 A | * | 3/1932 | Baker .......................... 244/154 |
| 3,100,895 A | * | 8/1963 | Resnick ................... 244/153 R |
| 3,250,500 A | * | 5/1966 | Hall ........................ 244/153 R |
| 3,309,045 A | | 3/1967 | Kinney |
| 3,547,384 A | | 12/1970 | Clark |
| 3,752,423 A | | 8/1973 | Schaeffer |
| 3,796,399 A | * | 3/1974 | Wechsler ................ 244/153 R |
| 3,861,626 A | * | 1/1975 | Hufstader ............... 244/153 R |
| 3,951,363 A | * | 4/1976 | Grauel .................... 244/153 R |
| 4,076,189 A | * | 2/1978 | Powell .................... 244/153 R |
| 4,099,690 A | * | 7/1978 | Mendelsohn et al. ... 244/153 R |
| 4,280,673 A | | 7/1981 | Brzack |
| 4,830,313 A | | 5/1989 | Cheng |
| 4,846,424 A | | 7/1989 | Prouty |
| 4,981,273 A | | 1/1991 | Petteys |
| 5,011,100 A | | 4/1991 | Gerstein |
| 6,003,815 A | | 12/1999 | Parker et al. |

* cited by examiner

*Primary Examiner*—Galen Barefoot
(74) *Attorney, Agent, or Firm*—Louis J. Bachand

(57) ABSTRACT

A kite has a generally delta shaped sail and supporting frame and has increased flight stability through locally increased drag realized by providing an air-passing ring structure in a plane adjacent the kite sail. The ring structure is formed from continued extents of the kite sail extending rearwardly of the sail trailing edge, folded up into the ring structure.

44 Claims, 3 Drawing Sheets

DELTA KITE WITH FLIGHT STABILIZING, AIR-PASSING RING STRUCTURE

RELATED APPLICATIONS

This application is a continuation in part of U.S. patent application Ser. No. 29/202,442, filed Mar. 31, 2004, the disclosure of which is incorporated herein by this reference, and further claims the benefit of U.S. Provisional Application Ser. No. 60/561,703, filed Apr. 13, 2004.

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

1. Field of the Invention

This invention relates to kites and, more particularly, to delta shaped kites having improved stability in flight through locally increased drag from the use of a drag feature at the kite trailing edge. The drag feature comprises an air-passing ring structure formed from a continued extent portion of the kite sail beyond the sail trailing edge, such as opposed continued extents that are folded to each other and fastened at a locus spaced outwardly from the general plane of the sail. The invention enables achieving a more stable kite flight at a minimum increased cost in manufacturing time and materials by using separate continued extents of the kite sail beyond the kite trailing edge, folded toward and joined to each other to form the ring shaped drag feature.

2. Description of the Related Art

Delta kites are a well known and popular style of kite. They comprise a delta-shaped sail of generally triangular panels and a frame that supports the sail generally in a single plane. Delta kite and delta-shaped kite are equivalent terms herein and refer to kites that have one or more panels of sail material arranged in a generally (Greek letter D) shape typically modified to have an angled leading edge symmetrical about the kite center axis, and an (same or different angle) angled trailing edge also symmetrical about the kite center axis. The kite bridle is attached at the front face of the kite, which is downwardly facing during kite flight.

BRIEF SUMMARY OF THE INVENTION

It is an object of the present invention to provide an improved delta kite. It is another object to provide a delta kite having better flight characteristics, such as greater in-flight stability in variable winds, particularly better recovery from drop-off of wind to avoid sliding off to the side of the flight path, flight at a higher angle above user but resistant to flying past vertical, greater lift capacity, and ease of launch from the fingertips. It is another object to provide a delta kite with these flight characteristic improvements at minimal or no increase in manufacturing cost. Yet another object is to locally increase drag in a delta kite selectively rearwardly of the kite trailing edge to provide the noted flight improvements. A further object is to provide a flight stabilizing, drag increasing air-passing ring structure preferably beyond the kite trailing edge and preferably formed from fabric continuations of the kite sail that are arranged to form an air-passing ring structure, e.g. from left and right side fabric continuations of the kite sail fabric that are folded to one another and fastened.

These and other objects of the invention to become apparent hereinafter are realized in a kite having localized drag for increased flight stability and comprising a generally delta shaped sail and a supporting frame, the sail having a leading edge and a trailing edge, the sail trailing edge having a rearward continued extent disposed outwardly from the sail in air-passing ring structure forming relation, the structure being shaped to increase locally drag on the kite. Preferably, the continued extent comprises separate, spaced apart left and right hand rearward continued extents that are folded toward each other and joined in a locus spaced outwardly from the sail to form the air-passing ring structure forming relation that is shaped to restrict through air flow and increase drag on the kite.

In these and like embodiments, typically, the air passing ring structure has a forward inlet and a rearward outlet, the ring structure being tapered inwardly from the inlet to the outlet in air flow restricting relation through the structure to increase drag on the kite, the sail is free of the air-passing ring structure forward of the sail trailing edge, the ring structure depending from the sail trailing edge in flight, the air-passing ring structure has an inlet at least partially formed by the sail trailing edge and an outlet formed solely from the continued extents, the sail defines left and right leading edge sleeves, the frame comprising left and right support members received within the left and right sleeves, or in which the frame comprises a center support member along its front to rear axis in a center sleeve that receives the center support member, the left and right support members being angularly disposed relative to the center support member, and a cross member fastened adjacent the left and right support members and across the central support member in frame defining relation, with the left and right support members being received in the left and right sleeves in kite sail leading edge supporting relation, and the center support member in the center sleeve.

More particularly, typically in this embodiment, the center support member extends through the air-passing ring structure, the sail is free of the air-passing ring structure forward of the sail trailing edge, and/or the air-passing ring structure is located entirely on and rearwardly of the sail trailing edge.

In a further embodiment, the invention provides a kite having localized drag for increased flight stability and comprising in a first plane a generally delta shaped sail having left and right panels and a supporting frame of a center support member, left and right support members and a cross member disposed across the center member and fastened at the left and right support members in angled relation, the sail left and right panels defining an angled kite leading edge and an angled kite trailing edge; the sail trailing edge having separate, spaced apart left and right panel defined rearward continued extents, the extents being folded from the first plane toward each other and joined in a locus spaced outwardly from the sail in air-passing ring structure forming relation, the structure being conically shaped to increase drag on the kite.

In this and like embodiments, typically, the sail left panel defines beyond the sail trailing edge a continued extent with a leftwardly disposed free end portion, the sail right panel defines beyond the sail trailing edge a continued extent with a rightwardly disposed free end portion, the free end portions being separately foldable toward each other from the first plane in the air-passing ring structure defining relation when fastened, the air passing ring structure has an forward inlet and a rearward outlet, the ring structure being tapered inwardly from the inlet to the outlet in air flow restricting relation through the structure to increase drag on the kite, the sail is free of the air-passing ring structure forward of the sail trailing edge, the air-passing ring structure has an inlet at least partially formed by the sail trailing edge and a generally circular outlet formed solely from the continued extents, the sail left panel defines a left leading edge sleeve, the sail right panel defines a right leading edge sleeves, the frame comprising left and right support members received within the left and right sleeves, the sail further defines a center sleeve extending on the center axis of the sail and the ring structure, the frame further comprising a center support member along the sail front to rear axis that is received in the center sleeve to support the sail and ring structure, the left and right support members being angularly disposed relative to the center support member, and a cross member fastened to the sail at the left and right support members and extending across the center support member in frame defining relation, the ring structure depends from the kite trailing edge in flight, and the air-passing ring structure is located entirely on and rearwardly below of the sail trailing edge.

In its method aspects the invention contemplates a method of forming a kite having locally increased drag, including supporting a generally delta-shaped sail on a frame, the sail having a trailing edge, providing a continued extent such as left and right continued extents rearwardly from the sail trailing edge, providing free end portions, e.g. on the left and right continued extents, and joining the left and right continued extent free end portions at a locus spaced from the sail in conical air-passing structure defining, and drag-increasing relation.

The invention further includes a method of increasing the flight stability of a generally delta-shaped kite extending in a first plane and having a trailing edge, including providing in a second plane adjacent the first plane a local air passing ring structure extending only rearwardly from the sail trailing edge, and defining the air-passing ring structure with free end portions of the sail comprising left and right continued extents of the sail trailing edge, and a method of increasing the flight stability of a generally delta-shaped kite extending in a first plane and having a trailing edge, including providing free end portions of the sail, and folding the sail free end portions into an air-passing ring structure extending in a second plane adjacent the first plane.

The invention further contemplates a method of flying a generally delta shaped kite comprising a frame and a sail supported by the frame, including during kite flight providing on the sail a trailing edge and a continued extent or extents with free ends beyond the trailing edge, and maintaining together the free ends in air-passing ring structure defining relation to increase kite drag.

BRIEF DESCRIPTION OF THE SEVERAL VIEWS OF THE DRAWINGS

The invention will be further described in conjunction with the attached drawings in which.

DETAILED DESCRIPTION OF THE INVENTION

The described invention of a trailing edge ring structure in a delta kite provides a localized drag on or near the trailing edge along the kite center line that creates a weather vane effect that enhances flight stability with a simple cut and fast construction. The centered drag feature provides greater stability in normal flight, facilitates recovery from large wind speed changes, and eases launch of the kite from the fingertips. Further, the centered drag helps the delta kite float directly downwind during a sudden wind lull, rather than falling off to the side which makes more work of flying the kite. In addition, the added drag enables greater lift and a more vertical flight but lessens the chances of the kite flying past vertical. The use of continued extents from the kite trailing edge provides the correct angle and shape to effectively catch the wind; an improved flight result that is problematical when simply adding flap pockets to the sail. The invention kite components are such that the kite is readily scaled to various sizes. Added sail flap pockets mean increased cost from using more material and from having further manufacturing operations. Finally, the invention kite is a more interesting profile in the sky, uniquely attractive and highly functional at the same time.

Figure 1:
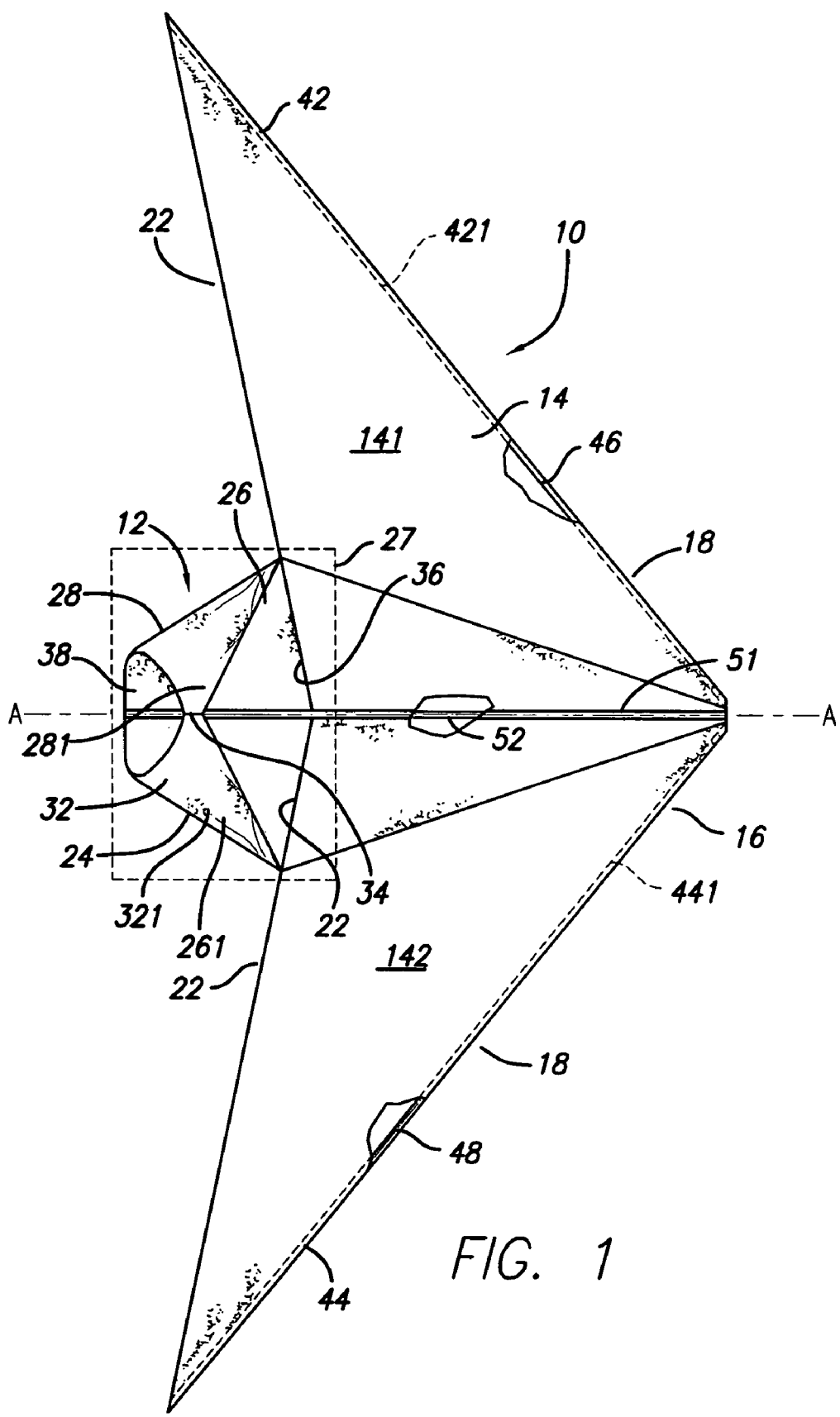
FIG. 1 is a front face plan view of the delta kite according to the invention.
Figure 2:
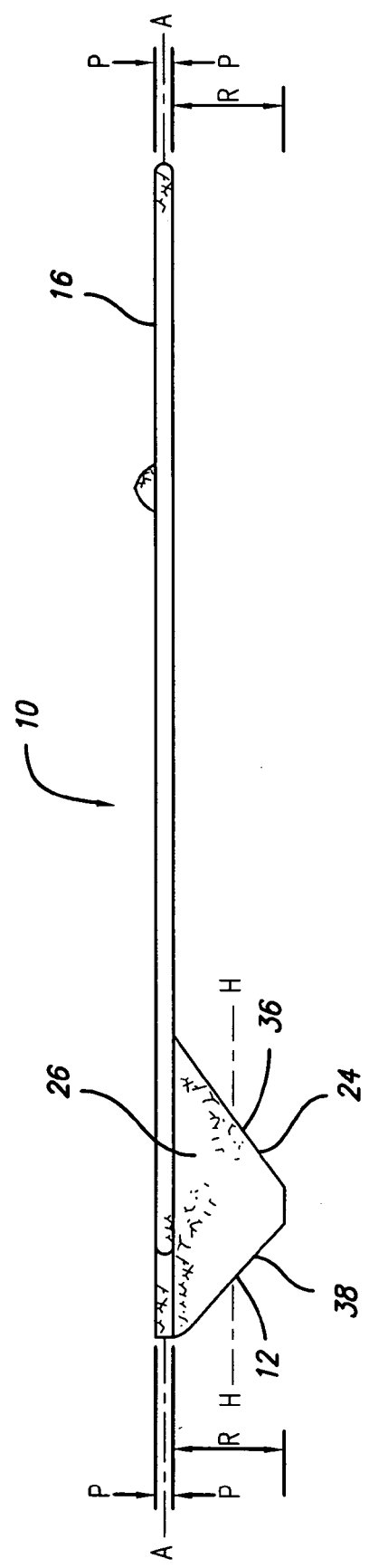
FIG. 2 is a side elevation view thereof.
Figure 3:
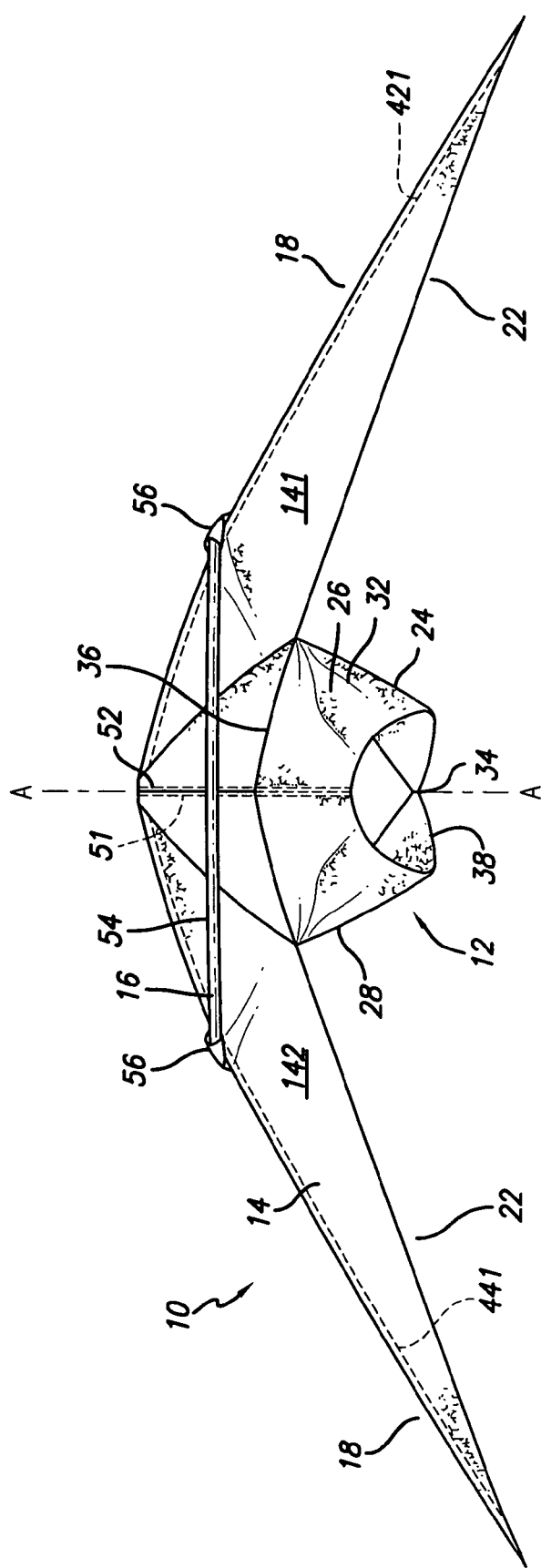
FIG. 3 is a rear elevation view thereof.

With reference now to the drawings in detail, the invention will be further described in conjunction with FIGS. 1 to 3 wherein kite 10 is shown to have a localized drag feature 12 for increased flight stability. Kite 10 comprises a generally delta shaped sail 14 and a supporting frame 16. Sail 14 has a leading edge 18 and a trailing edge 22. Sail trailing edge 22 has a rearward continued extent 24 disposed, as shown, outwardly from (normal to) the sail 14 in air-passing ring structure 26 forming relation. Ring structure 26 is shaped to inflate in the wind and increase locally, e.g. in zone 27, drag on the kite.

With further reference to the Figures, continued extent 24 comprises separate, spaced apart left and right hand rearward continued extents 28, 32 that are folded toward each other as shown, and joined in a locus 34 spaced outwardly from the sail 14 to form the air-passing ring structure 26 shaped to restrict through air flow and increase drag on the kite.

Air passing ring structure 26 has a forward inlet 36 and a rearward outlet 38, the ring structure being tapered inwardly from the inlet to the outlet in air flow restricting relation through the structure to increase drag on the kite.

Sail 14 is shown to be free of the air-passing ring structure 26 in area 38 comprising all of the sail that lies forward of the sail trailing edge 22. Ring structure 26 hangs typically below the sail 14 and depends from the sail trailing edge in flight.

Air-passing ring structure 26 forward inlet 36 is at least partially formed by the sail trailing edge 22 and its outlet 38 is typically formed solely from the continued extents 28, 32, the inlet being relatively greater in size and the outlet being relatively smaller in size.

Sail 14 has left and right leading edge sleeves 42, 44 comprising sewn or sealed enclosures 421, 441 that receive left and right support members 46, 48 of the frame 16 that are sized to be received within the left and right sleeves to support the kite leading edge 18. Sail 14 further has a center sleeve portion 51 aligned with its nose to tail axis A—A. Sleeve portion 51 extent continues through the length of the ring structure 26. Frame 16 further includes a center support member 52 along the front to rear axis A—A and disposed within the center sleeve portion 51 at the sail 14 and ring structure 26. Left and right support members 46, 48 are angularly disposed relative to the center support member 52. Frame cross member 54 is fastened at the left and right support members 46, 48 by being removably received in pockets 56 fixed to the sail 14 as shown; so fastened, cross member is disposed across central support member 52.

Center support member 52 extends through the air-passing ring structure 26, as shown, in parallel with the horizontal axis H—H thereof (FIG. 3) between inlet 36 and outlet 38, and tangentially of the inner periphery 261 of the ring structure. As shown, the sail 14 is free of the air-passing ring structure 26 forward of the sail trailing edge 22 as the air-passing ring structure is located entirely on and rearwardly of the sail trailing edge. Center support member 52 is spaced from the continued extents locus of joining 34.

In further detail, kite 10 having localized drag for increased flight stability comprises in a first plane P—P a generally delta shaped sail 14 having left and right panels 141, 142 and a supporting frame 16 of a center support member 52, left and right support members 46, 48 and a cross member 54 across the center support member 52 and fastened in pockets 56 at the left and right support members in angled relation as shown.

Sail left and right panels 141, 142 define an angled kite leading edge 18 and an angled kite trailing edge 22. Sail trailing edge 22 has separate, spaced apart left and right panel defined rearward continued extents 28, 32 that are folded from the first plane P—P toward each other and joined in the locus 34 spaced outwardly from the sail 14 in air-passing ring structure 26 forming relation; the ring structure being conically shaped as shown to increase drag on the kite selectively at the structure.

In this embodiment, the sail left panel 141 defines beyond the sail trailing edge 22 a continued extent 28 with a leftwardly disposed free end portion 281. The sail right panel 142 defines beyond the sail trailing edge 22 a continued extent 32 with a rightwardly disposed free end portion 321; free end portions 281, 321 are separately foldable toward each other from the first plane P—P in the air-passing ring structure 26 defining relation when joined at locus 34 by sewing, sealing, or by use of another kind of fastener.

In a first method, the invention forms a kite having locally increased drag, the method including supporting a generally delta-shaped sail 10 on a frame 16, the sail having a trailing edge 22, providing a continued extent 24 such as left and right continued extents 28, 32 rearwardly from the sail trailing edge, providing free end portions 281, 321 on the left and right continued extents, and joining the left and right continue extent free end portions at a locus 34 spaced from the sail in conical air-passing structure 26 defining relation.

In a second method, the invention increases flight stability of a generally delta-shaped kite extending in a first plane P—P and having a trailing edge 22, the method including providing in a second plane R—R adjacent the first plane a local air passing ring structure 26 extending only rearwardly from the sail trailing edge, and defining the air-passing ring structure with free end portions 281, 321 of the sail comprising left and right continued extents 28, 32 of the sail trailing by folding the sail free end portions into the air-passing ring structure extending in the second plane R—R adjacent the first plane.

In a third method, the invention provides a method of flying a generally delta shaped kite comprising a frame 16 and a sail 14 supported by the frame, including during kite flight providing on the sail a trailing edge 22 and a continued extent 24 or extents 28, 32 with free ends 281, 321 beyond the trailing edge, and maintaining together the free ends of the continued extents in air-passing ring structure 26 defining relation to increase kite drag.

The invention thus provides an improved delta kite having better flight characteristics, such as greater in-flight stability in variable winds, particularly better recovery from drop-off of wind to avoid sliding off to the side of the flight path, flight at a higher angle above user but resistant to flying past vertical, greater lift capacity, and ease of launch from the fingertips by locally increasing drag in the delta kite selectively rearwardly of the kite trailing edge using a flight stabilizing, drag increasing air-passing ring structure preferably beyond the kite trailing edge and preferably formed from fabric continuations of the kite sail that are arranged to form the air-passing ring structure, e.g. from left and right side fabric continuations of the kite sail fabric that are folded to one another and fastened. The delta kite with these flight characteristic improvements is realized at minimal or no increase in manufacturing cost.

The foregoing objects are thus met.

We claim:

1. A kite having localized drag for increased flight stability, said kite comprising a generally delta shaped sail and a supporting frame, said sail having a leading edge and a trailing edge, said sail trailing edge having a rearward continued extent disposed outwardly from said sail in air-passing ring structure forming relation, said ring structure having an inlet at least partially formed by said sail trailing edge, said ring structure being shaped to increase drag on said kite.

2. The kite according to claim 1, in which said air passing ring structure has a forward inlet and a rearward outlet, said ring structure being tapered inwardly from said inlet to said outlet in air flow restricting relation through said structure to increase drag on said kite.

3. The kite according to claim 1, in which said sail is free of said air-passing ring structure forward of said sail trailing edge, said ring structure depending from said sail trailing edge in flight.

4. The kite according to claim 1, in which said air-passing ring structure has an outlet formed solely from said continued extents.

5. The kite according to claim 1, in which said sail defines left and right leading edge sleeves, said frame comprising left and right support members received within said left and right sleeves.

6. The kite according to claim 1, in which said frame comprises a center support member along its front to rear axis, left and right support members angularly disposed relative to said center support member, and a cross member fastened adjacent said left and right support members and across said central support member in frame defining relation.

7. The kite according to claim 6, in which said sail defines left and right receiving sleeves, said left and right support members being received in said left and right sleeves in kite sail leading edge supporting relation.

8. The kite according to claim 7, in which said sail defines a center sleeve, said center support member being received in said center sleeve and extending through said air-passing ring structure.

9. The kite according to claim 8, in which said sail is free of said air-passing ring structure forward of said sail trailing edge.

10. The kite according to claim 1, in which said air-passing ring structure is located entirely on and rearwardly of said sail trailing edge.

11. A kite having localized drag for increased flight stability, said kite comprising a generally delta shaped sail and a supporting frame, said sail having a leading edge and a trailing edge, said sail trailing edge having separate, spaced apart left and right hand rearward continued extents, said extents being folded toward each other and joined in a locus spaced outwardly from said sail in air-passing ring structure forming relation, said structure being shaped to increase drag on said kite.

12. The kite according to claim 11, in which said air passing ring structure has a forward inlet and a rearward outlet, said ring structure being tapered inwardly from said inlet to said outlet in air flow restricting relation through said structure to increase drag on said kite.

13. The kite according to claim 11, in which said sail is free of said air-passing ring structure forward of said sail trailing edge, said ring structure depending from said sail trailing edge in flight.

14. The kite according to claim 11, in which said air-passing ring structure has an inlet at least partially formed by said sail trailing edge and an outlet formed solely from said continued extents.

15. The kite according to claim 11, in which said sail defines left and right leading edge sleeves, said frame comprising left and right support members received within said left and right sleeves.

16. The kite according to claim 11, in which said frame comprises a center support member along its front to rear axis, left and right support members angularly disposed relative to said center support member, and a cross member fastened adjacent said left and right support members and said central support member in frame defining relation.

17. The kite according to claim 16, in which said sail defines left and right receiving sleeves, said left and right support members being received in said left and right sleeves in kite sail leading edge supporting relation.

18. The kite according to claim 17, in which center support member extends through said air-passing ring structure.

19. The kite according to claim 18, in which said sail is free of said air-passing ring structure forward of said sail trailing edge.

20. The kite according to claim 11, in which said air-passing ring structure is located entirely on and rearwardly of said sail trailing edge.

21. The kite according to claim 11, in which said air passing ring structure has a relatively greater forward inlet and a relatively smaller rearward outlet, whereby said ring structure tapers inwardly from said inlet to said outlet in air flow restricting relation through said structure to increase drag on said kite.

22. The kite according to claim 11, in which said sail is free of said air-passing ring structure forward of said sail trailing edge, said ring structure depending from said sail trailing edge in flight.

23. The kite according to claim 22, in which said air-passing ring structure has an inlet at least partially formed by said sail trailing edge and a generally circular outlet formed solely from said continued extents.

24. The kite according to claim 23, in which said sail defines left and right leading edge sleeves, said frame comprising left and right support members received within said left and right sleeves in leading edge supporting relation.

25. The kite according to claim 24, in which said sail further defines a center sleeve, said frame further comprises a center support member along its front to rear axis received in said center sleeve, said left and right support members being angularly disposed relative to said center support member, and a cross member fastened to said sail at said left and right support members and disposed across said central support member in frame defining relation.

26. The kite according to claim 25, in which said center support member extends through said air-passing ring structure in parallel with the axis of said ring structure between said inlet and outlet, said center support member being spaced from said continued extents locus of joining.

27. The kite according to claim 26, in which said sail is free of locally drag increasing structures forward of said sail trailing edge.

28. The kite according to claim 27, in which said air-passing ring structure is located entirely on and rearwardly of said sail trailing edge and below said sail trailing edge in flight.

29. A kite having localized drag for increased flight stability, said kite comprising in a first plane a generally delta shaped sail having left and right panels and a supporting frame of a center support member, left and right support members and a cross member disposed across said center support member and fastened at said left and right support members in angled relation, said sail left and right panels defining an angled kite leading edge and an angled kite trailing edge; said sail trailing edge having separate, spaced apart left and right panel defined rearward continued extents, said extents being folded from said first plane toward each other and joined in a locus spaced outwardly from said sail in air-passing ring structure forming relation, said structure being conically shaped to increase drag on said kite.

30. The delta kite according to claim 29, in which said sail left panel defines beyond said sail trailing edge a continued extent with a leftwardly disposed free end portion, said sail right panel defines beyond said sail trailing edge a continued extent with a rightwardly disposed free end portion, said free end portions being separately foldable toward each other from said first plane in said air-passing ring structure defining relation when fastened.

31. The kite according to claim 30, in which said air passing ring structure has an forward inlet and a rearward outlet, said ring structure being tapered inwardly from said inlet to said outlet in air flow restricting relation through said structure to increase drag on said kite.

32. The kite according to claim 31, in which said sail is free of said air-passing ring structure forward of said sail trailing edge.

33. The kite according to claim 32, in which said air-passing ring structure has an inlet at least partially formed by said sail trailing edge and a generally circular outlet farmed solely from said continued extents.

34. The kite according to claim 29, in which said sail left panel defines a left leading edge sleeve, said sail right panel defines a right leading edge sleeves, said frame comprising left and right support members received within said left and right sleeves.

35. The kite according to claim 34, in which said sail further defines a center sleeve extending on the center axis of said sail and said ring structure, said frame further comprises a center support member along said sail front to rear axis received in said center sleeve, said left and right support members being angularly disposed relative to said center support member, and a cross member fastened to said sail at said left and right support members and extending across said center support member in frame defining relation.

36. The kite according to claim 35, in which center support member extends through said air-passing ring structure, and is attached thereto by said center sleeve.

37. The kite according to claim 36, in which said sail is free of said air-passing ring structure forward of said sail trailing edge, said ring structure depending from said kite trailing edge in flight.

38. The kite according to claim 29, in which said air-passing ring structure is located entirely on and rearwardly below of said sail trailing edge.

39. A method of forming a kite having locally increased drag, including supporting a generally delta-shaped sail on a frame, said sail having a trailing edge, providing a continued extent rearwardly from said sail trailing edge, providing free end portions on said continued extent, and joining said continued extent free end portions at a locus spaced from said sail in conical air-passing structure defining relation.

40. A method of forming a kite having locally increased drag, including supporting a generally delta-shaped sail on a frame, said sail having a trailing edge, providing left and right continued extents rearwardly from said sail trailing edge, providing free end portions on said left and right continued extents, and joining said left and right continue extent free end portions at a locus spaced from said sail in conical air-passing structure defining relation.

41. A method of increasing the flight stability of a generally delta-shaped kite extending in a first plane and having a trailing edge, including providing in a second plane adjacent said first plane a local air passing ring structure extending only rearwardly from said sail trailing edge.

42. The method according to claim 41, including also defining said air-passing ring structure with free end portions of said sail comprising left and right continued extents of said sail trailing edge.

43. A method of increasing the flight stability of a generally delta-shaped kite extending in a first plane and having a trailing edge, including providing free end portions of said sail beyond said trailing edge, and folding said sail free end portions into an air-passing ring structure extending in a second plane adjacent said first plane and located entirely on and rearwardly of said sail trailing edge.

44. A method of flying a generally delta shaped kite comprising a frame and a sail supported by said frame, including during kite flight providing on said sail a trailing edge and continued extents with free ends beyond said trailing edge, and maintaining together said free ends of said continued extents in air-passing ring structure defining relation entirely on and rearwardly of said sail trailing edge to increase kite drag.

* * * * *